Oct. 21, 1969  R. L. LA BARGE  3,473,965
PROTECTIVE CLOSURE FOR BATTERY TERMINAL
Filed June 23, 1967

INVENTOR.
ROBERT L. LABARGE.
BY Arnold B. Silverman
his ATTORNEY.

United States Patent Office 3,473,965
Patented Oct. 21, 1969

3,473,965
PROTECTIVE CLOSURE FOR BATTERY TERMINAL
Robert L. La Barge, Pittsburgh, Pa., assignor to Aluminum Company of America, Pittsburgh, Pa., a corporation of Pennsylvania
Filed June 23, 1967, Ser. No. 648,450
Int. Cl. H01m 1/02
U.S. Cl. 136—169          12 Claims

ABSTRACT OF THE DISCLOSURE

A pilferproof closure for dry cell batteries having a removable sector defined by a weakened line adapted to overlie the battery terminal. A pull tab within the removable sector to facilitate severance of the weakened line.

This invention relates generally to frangible closures and more specifically to pilferproof closures for dry cell type batteries.

In the conventional methods of marketing dry cell batteries, the batteries are shipped and stored with their terminals unprotected. This presents the distinct disadvantage of the purchaser being unable to determine whether the battery has been previously used and also whether there might have been inadvertent shorting of the battery during storage. This is the direct result of there being no effective of the battery terminal and also no visual indication of whether there has been previous use.

It is an object of this invention to provide an individual pilferproof closure which will prevent use of a battery without leaving a visual indication of such use.

It is another object of this invention to provide a pilferproof battery closure which will effectively prevent inadvertent shorting of the battery terminal.

It is a further object of this invention to provide a battery closure which will provide a clear, visible indication of any previous use or attempt to gain access to the terminal.

It is another object of this invention to provide a frangible pilferproof battery closure having a removable portion which is capable of being readily severed without the need for a separate tool.

It is another object of this invention to provide a pilferproof battery closure having integral tab means to facilitate severance of the removable portion.

It is yet another object of this invention to provide a frangible closure which has an integral opening device affording a mechanical leverage advantage to ease opening.

These and other objects will be more fully understood and appreciated from the following description of the invention on reference to the illustrations appended hereto, in which.

Figure 1:
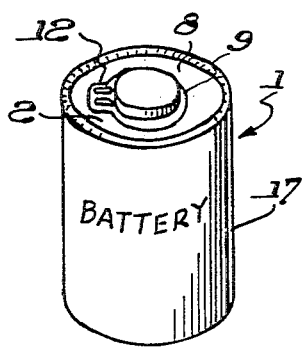
FIG. 1 is a perspective view of a battery assembly embodying the invention.

Referring now more particularly to the drawings, a dry cell type battery 1, having a top wall 3, a bottom wall and a connecting side or peripheral wall 17, has a pilferproof closure 2 secured thereto overlying the battery terminal 4a of electrode 4. The top wall 3 is completely covered by the closure 2 thereby preventing access to terminal 4a. (For clarity of explanation the word "terminal" has been used to refer to the upper portion of electrode 4 and the reference numeral 22 has been used to refer to the electrode cover. It is to be understood, however, that as cover 22 is made from a conductive material, the word "terminal" when used in a general sense will be employed to refer to either terminal 4a or cover 22 as they are functionally equivalent.) Any reference to the "exposed portion" of the battery top wall shall refer to the portion of the top wall visible prior to closure attachment.

Figure 2:
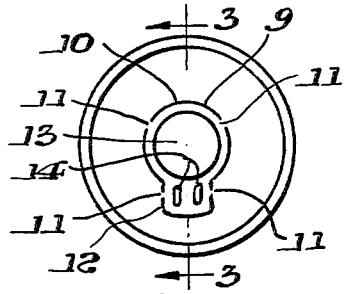
FIG. 2 is a plan view of a closure of this invention.
Figure 3:
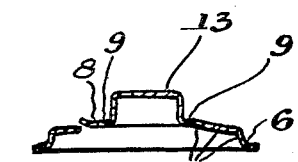
FIG. 3 is a vertical section of the closure shown in FIG. 2 taken along line 3—3.
Figure 4:
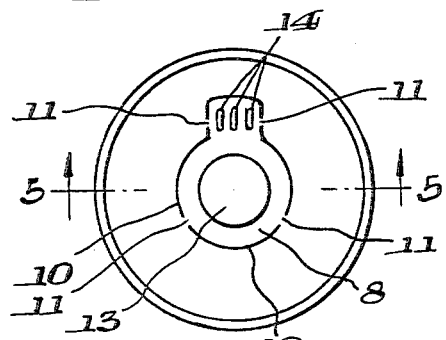
FIG. 4 is a plan view of a battery assembly embodying the invention.

The closure 2 as shown in FIGS. 2 and 3, is substantially circular and has a flanged peripheral portion 6 and a radially inwardly disposed portion 7 which is upwardly and inwardly inclined with respect to the peripheral portion 6. Within the inwardly disposed portion 7 is a removable sector 8 defined by one or more weakened lines 9. The weakened line 9 may be a continuous or segmented score line or an alternating lanced and bridged line or any other suitably weakened line which is adapted to facilitate severance along a predetermined path for ultimate removal of sector 8 from the remainder of closure 2. The form of closure illustrated in FIG. 2 has alternate lanced or fractured portions 10 and bridge portions 11. The bridge portions 11 may be either unweakened or weakened to a slight degree, as by scoring.

Figure 6:
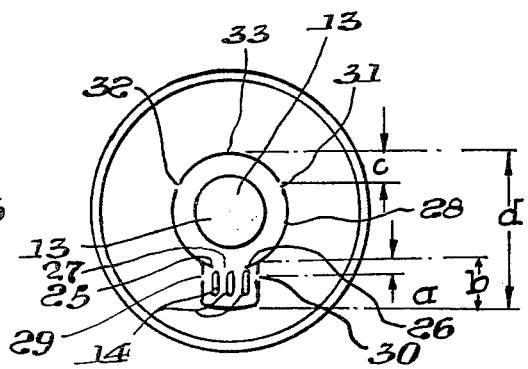
FIG. 6 is a plan view of a modified form of pilferproof closure of this invention.

A pull tab 12 which may be conveniently formed integrally with the closure is provided. As is illustrated in FIG. 6, in order to facilitate manual engagement of the pull tab, it is preferred to provide a lanced or fractured portion of weakened line 9 at the radially outermost portion of tab 12. Bridges 29, 30 are provided to retain the pull tab in the desired position.

Within radially inwardly disposed portion 7 is removable sector 8 having an upwardly disposed boss 13 which overlies the terminal 4a. The boss 13 may be of sufficient height to be spaced from the terminal 4a and top wall 3. In the event the closure 2 is formed of an electrically conductive material it is preferred that its underside be insulated from the terminal to prevent creation of an electrically conductive path between the closure 2 and the terminal 4a to prevent shorting of the terminal 4a. This may be accomplished by either providing a space between the underside of the boss 13 and terminal 4 relying on the air as an insulator or by providing insulating material between the boss and the terminal as by coating the closure, for example.

It should be understood that the object is to effectively insulate the closure to prevent electrically effective contact with the terminal 4a. Whether this be accomplished by manufacturing the closure from an insulating material spacing the closure from the terminal or providing an independent insulating material or any combination of these is immaterial and no distinction is intended in this regard, unless expressly recited. In batteries not having the terminal insulated from the remainder of the top wall 3, effective insulation may be obtained by increasing the upward inclination of portion 7 or by providing an intermediate insulating material as by coating either the closure or top wall or by other convenient means. An organic compound, for example, might be advantageously employed. Alternatively, a paper web might be employed.

In a preferred form of closure, the pull tab 12 is provided with stiffening means such as ribs 14 which may conveniently be formed integrally in the tab. This will facilitate use of the tab to effect opening. As is shown in FIG. 2, these ribs may conveniently be disposed in a generally radial orientation in order to prevent bending of the tab when the tab end is raised.

In effecting opening of the closure to permit access to the battery terminal, the pull tab 12 may be grasped with the fingers and raised to progressively sever weakened line 9 thereby freeing removable sector 8. The removable sector 8 may then be discarded and the battery used in normal fashion. It may be convenient to insert a finger nail into the lanced portion at the end of the tab to facilitate initial raising of the tab. More convenient finger engagement could then be effected. Although it is by no means necessary and not preferred, if desired an implement could be used to initiate elevation of the pull tab.

As closure 2 is preferably made from a single piece of material and substantially completely covers the terminal and the exposed portion of the top wall of the battery, it is not possible to gain access to the terminal without fracturing weakened line 9 and removing sector 8. As a portion of the closure is fractured in opening, replacement cannot be made without it being obviously detectable. Also, there is no aperture through which a wire or other conductive device could be inserted to engage the terminal in an electrically conductive manner prior to opening. The top wall 3 and terminal 4 are effectively covered to prevent such access.

Figure 5:
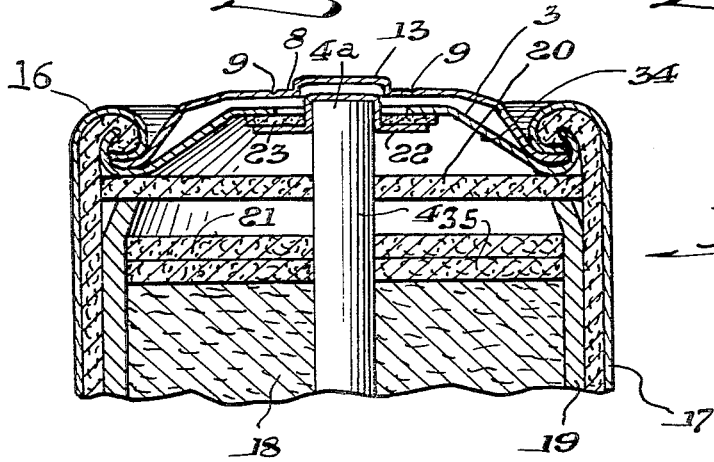
FIG. 5 is an enlarged fragmentary vertical section of the battery assembly shown in FIG. 4, taken along line 5—5.

FIG. 5 shows a type of conventional dry cell battery structure with a pilferproof closure of this invention secured thereto. The battery has a centrally disposed electrode 4 with a terminal 4a, a surrounding electrolyte material 18 and a zinc casing 19. Cardboard webs 20, 35 and insulating material 21 separate the top wall 3 from the electrolyte 18, with web 20 keeping zinc casing 19 out of contact with top wall 3. The peripheral wall 17 is in this instance shown as a paper-aluminized web laminate with the web being outwardly disposed. The top wall 3 consists of a metallic electrode cover 22, an overlying insulating washer 23 and an outer conductor member 34.

The form of closure shown in FIGS. 2 and 3 has a generally round panel. The outwardly disposed flange 6 merges into upwardly and inwardly disposed sector 7. Upstanding boss 13 projects upwardly from sector 7 within removable portion 8.

In the form of closure shown in FIG. 6, the weakened line defining removable sector 8 consists of a series of lanced line portions and bridge portions 29, 30, 31, 32. The initial movement in raising tab 12 will result in severance of bridges 29, 30. In effecting this initial movement, a mechanical advantage as a result of the pull tab functioning as a lever will be obtained. This advantage will be approximately equal to $b/a$. It will thus be appreciated that it is advantageous to place bridges 29, 30 close to the innermost portion of the tab in order to reduce the length of $a$ and thereby increase the mechanical advantage. Further, a mechanical advantage equal to $d/c$ will be provided in severing bridges 31, 32 as the removable sector functions as a lever fulcruming about fulcrum point 33. It is, therefore, seen that a material mechanical advantage is provided to increase ease of opening. It is possible to design the closure with varying numbers and positions of bridges in order to alter resistence to opening. This is a matter of design flexibility within the invention.

An additional modification is illustrated in the form of removable sector 8 shown in FIG. 6. In this form the weakened line has two added sections 25, 26. This provides flexible hinge area 27 intermediate sections 25, 26. This facilitates ease of opening as the hinge width is reduced.

As is shown in FIG. 5, the closure 2 may conveniently be secured to the battery by engaging peripheral portion 6 with joint or seam 16 which joins top wall 3 to peripheral wall 17. This jointure may be effected either through frictional engagement or by actually seaming the peripheral portion 6 into joint 16. Alternatively, the closure may be adhesively secured.

It will be appreciated that this design prevents electrically conductive contact between the closure and terminal. The closure may, therefore, be made from a deformable material which may be a conductive metal, such as aluminum. This closure is adapted to be made from a single web of material and therefore may be economically and simply produced. It may be applied either during battery manufacture or subsequent thereto.

It will be appreciated that in addition to preventing intentional or unintentional battery drainage prior to purchase by the consumer, this invention will also enable the consumer to determine whether a given battery in his home has been previously used by a member of the household.

While the closures selected for purposes of illustration have a substantially circular panel, it will be appreciated that numerous panel configurations may be employed. All that is required is that the battery terminal be effectively covered and that the closures have a removable portion of adequate size to permit full access to the terminal upon removal. The generally circular panel is a preferred form as it yields an effective, continuous engagement with the battery seam and thereby provides an economical means of permanently securing the closure. An engagement which is not continuous may be acceptable in some circumstances. Also, where the closure is to be adhesively secured to the battery the considerations favoring a substantially circular panel are not necessarily material.

Where example has been employed for clarity of description, a specific type of battery structure has been discussed. It will be apparent to those skilled in the art that applicant's closure may be effectively employed on numerous types of battery structures.

Whereas particular embodiments of the invention have been described above for purposes of illustration, it will be apparent to those skilled in the art that numerous variations of the details may be made without departing from the appended claims.

What is claimed is:
1. A closure for a battery comprising
a panel made from a substantially rigid material having a flanged periphery and a radially inwardly disposed portion;
a removable sector disposed within said inwardly disposed portion defined by at least one weakened line;
at least a portion of said removable sector being substantially centrally disposed within said panel;
an upwardly disposed boss within said removable sector adapted to assume an overlying relationship with respect to a terminal of said battery in an electrically nonconductive relationship therewith;
an integral pull tab within said removable sector disposed radially outwardly of said upwardly disposed boss;
said tab having an integral hinge portion connecting said tab with the remainder of said removable sector;
a tab defining portion of said weakened line lanced at its radially outermost extremity to define an outer free edge portion of said tab; and
said tab defining portion of said weakened line defining a pair of transverse lines generally connecting opposed ends of said integral hinge portion with opposed ends of said outer free edge, whereby engagement of said pull tab and application of a lifting force thereto results in progressive severance of said removable portion along said weakened line thereby permitting removal and exposure of said battery terminal.

2. The closure of claim 1 wherein said closure has a generally circular panel and said pull tab has integral stiffening means.

3. The closure of claim 1 wherein said closure is made from a substantially rigid electrically conductive material, and said weakened line, other than said outer free edge of said tab, is scored.

4. The closure of claim 1 wherein said weakened line comprises alternate lanced and bridge portions.

5. The closure of claim 4 wherein said pull tab is connected to the remainder of said removable sector by means of said hinge portion, and said pull tab is connected to the adjacent portion of said panel not within said removable sector by a bridge portion disposed on each of said transverse lines, and each said bridge portion disposed on each said line at a position in closer proximity to said hinge portion than to said outer free edge.

6. The closure of claim 5 wherein said pull tab is substantially rigid and adapted to fulcrum about said hinge portion when said outer free edge is raised to cause said tab to function as a second class lever in severing said bridges.

7. The closure of claim 6 wherein said hinge portion is of smaller width than the mean width of said pull tab and the portion of said weakend line not defining said tab having at least two bridges connecting said removable portion with the remainder of said closure.

8. A battery assembly comprising
   an elongate generally cylindrical dry cell battery having a top wall, a bottom wall and a connecting peripheral wall;
   a single upstanding terminal substantially centrally disposed in the top wall of said battery;
   a metal closure having a portion thereof disposed in spaced overlying relationship with respect to said terminal secured to said battery;
   said closure having a generally circular panel substantially completely covering the exposed portion of said top wall of said battery;
   a removable sector disposed within said inwardly disposed portion defined by at least one weakened line;
   at least a portion of said removable sector being substantially centrally disposed within said panel;
   an integral pull tab within said removable sector defined by said weakened line and disposed radially outwardly of said upstanding boss;
   said tab having an integral hinge portion connecting said tab with the remainder of said removable sector,
   a tab defining portion of said weakened line lanced at its radially outermost extremity defining an outer free edge portion of said tab to facilitate engagement of said tab for initiation of severance of said weakened line, and
   said tab defining portion of said weakened line having a pair of transverse tab defining lines generally connecting opposed ends of said integral hinge portion with opposed ends of said outer free edge,
   whereby gripping of said pull tab and applying a lifting force thereto results in severance of said removable portion along said weakened line thereby exposing said battery terminal.

9. The battery assembly of claim 8 wherein said battery has a seam joining said top wall with said peripheral wall and a radially outwardly disposed portion of said panel in frictional engagement with said seam and said panel substantially completely covering the exposed portion of said top wall,
   said closure is made from asubstantially rigid material,
   integral stiffening means within said pull tab extending generally radially inwardly,
   said weakened line consisting of alternate lanced and bridged sections,
   a first bridge disposed on each of said transverse tab defining lines,
   said rigidified tab adapted to fulcrum about its inner end and serve as a second class lever to sever said first bridges on said transverse lines responsive to raising said free edge of said tab,
   the remainder of said weakened line other than said tab defining sector having a pair of second bridge sections, and
   said portion of said removable portion disposed generally diametrically opposite from said tab adapted to serve as a fulcrum of a second class lever to provide a mechanical advantage in the fracture of said second bridges.

10. The battery assembly of claim 8 wherein said closure is made from an electrically conductive material and an insulating material is disposed between said closure and said top wall over at least a substantial portion of their adjacent surfaces.

11. The battery assembly of claim 10 wherein at least one of said surfaces is coated with said insulating material.

12. The battery assembly of claim 11 wherein said insulating material is an organic coating.

References Cited

UNITED STATES PATENTS

| 1,539,427 | 5/1925 | Rector | 136—132 |
| 1,671,566 | 5/1928 | Baldwin | 136—132 |
| 2,789,718 | 4/1957 | Baumann | 220—27 |
| 3,195,764 | 7/1965 | Fried et al. | 220—54 |
| 3,246,791 | 4/1966 | Asbury | 220—27 |
| 3,358,873 | 12/1967 | Gelber | 220—54 |

FOREIGN PATENTS 967,418  8/1964  Great Britain.

WINSTON A. DOUGLAS, Primary Examiner

D. L. WALTON, Assistant Examiner

U.S. Cl. X.R.

136—133; 220—54